United States Patent [19]
Jacobi et al.

[11] 3,832,919
[45] Sept. 3, 1974

[54] ORBITAL CRANKSHAFT LATHE MECHANISM AND METHODS OF MACHINING.

[75] Inventors: John A. Jacobi; Anthony E. Sedlar, both of Saginaw, Mich.

[73] Assignee: The Wickes Corporation, Saginaw, Mich.

[22] Filed: Apr. 16, 1973

[21] Appl. No.: 351,795

[52] U.S. Cl. .......................................... 82/1 C, 82/9
[51] Int. Cl. ............................ B23b 1/00, B23b 5/18
[58] Field of Search ................... 82/1, 1 C, 8, 9, 10

[56] References Cited
UNITED STATES PATENTS

| | | | |
|---|---|---|---|
| 1,744,885 | 1/1930 | Groene | 82/9 X |
| 2,148,293 | 2/1939 | Groene | 82/9 |
| 2,421,147 | 5/1947 | Groene | 82/9 |
| 3,460,413 | 8/1969 | Hermann | 82/9 |

*Primary Examiner*—Harrison L. Hinson
*Attorney, Agent, or Firm*—Learman & McCulloch

[57] ABSTRACT

A crankshaft lathe having orbiting girts mounting tool holders which have axially overlapping tools for simultaneously machining the side-by-side eccentric crank pins of a multiple throw crankshaft having at least a pair of such crank pins in axially abutting angularly offset relation. The invention also is concerned with a method of machining such crankshafts wherein the crank pins are first rough machined in a manner to leave some material at the interface of the abutting pins and finally are finished machined by overlapping tools which during a machining orbit must in effect pass through one another.

13 Claims, 11 Drawing Figures

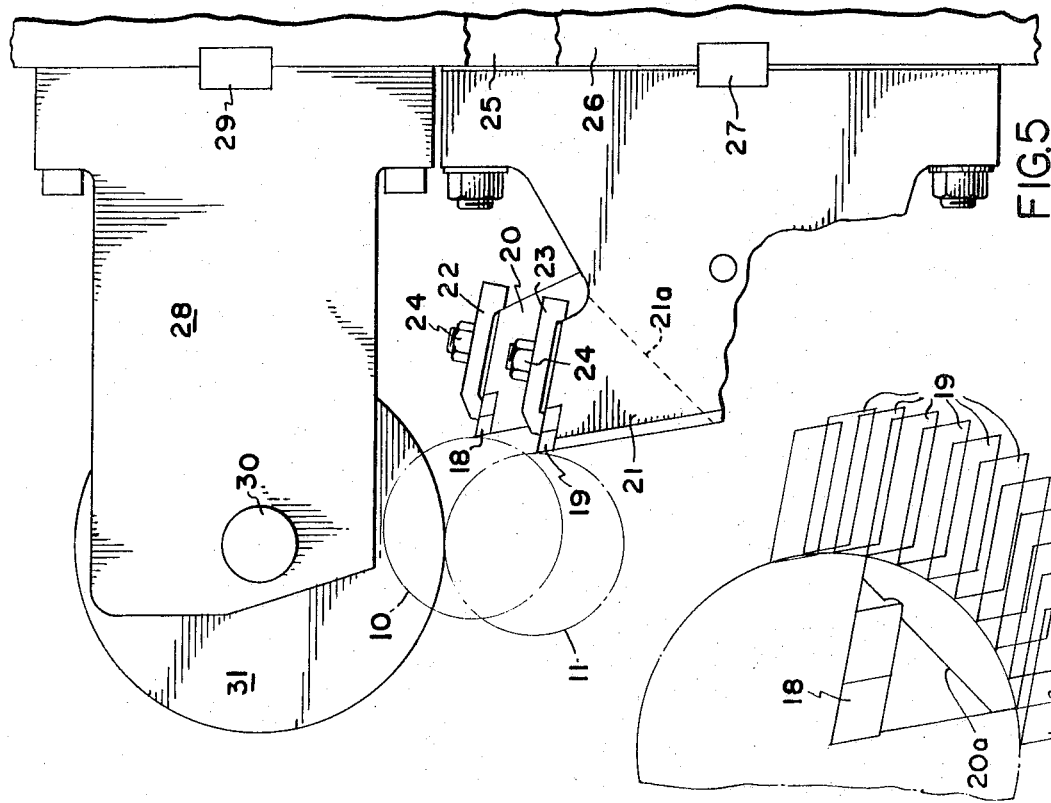

ORBITAL CRANKSHAFT LATHE MECHANISM AND METHODS OF MACHINING

BACKGROUND OF THE INVENTION

Multiple throw crankshafts of the character indicated have more recently been designed for relatively compact engines requiring shorter crankshafts. It is believed that up to the present time four crankshaft lathes have been required to machine such shafts, two "rough" cutting machines to machine the side-by-side crankshaft pins in sequence, and then two more "finish" cutting machines to finally sequentially "finish" machine the side-by-side crankshaft pins. In shifting such crankshafts, which may typically weigh 300 pounds or more, there is inevitably a loss in radial index or change in radial position during the unchucking and rechucking of a workpiece, with the attendant loss of accuracy which this entails.

One of the prime objects of the present invention is to provide a method of machining such crankshafts which requires the deployment of only a single "rough" cutting machine and a single "finish" cutting machine.

Another object of the invention is to provide apparatus which is capable of simultaneously "finish" cutting angularly offset crankshaft pins which axially overlap to an extent and machining axially overlapping inner collars for the crankshaft pins at their interface.

A further object of the present invention is to provide a method and machinery for machining crankshafts of the character described which can hold a relative angularity tolerance between pins of plus or minus .002 to .005 thousandths of an inch.

Still another object is to design a method and system for machining crankshafts having axially abutting angularly offset eccentrically disposed pins in an efficient and accurate manner with considerably less machinery than formerly, so that a considerable saving in the investment required for the production machining of such crankshafts is possible.

A still further object of the invention is to design a system and method of the character described which minimizes "down" time in shifting the crankshaft from one machine to another, and also minimizes the labor and loading equipment required to accomplish this, to thus far more rapidly and economically accomplish the machining operation.

Other objects and advantages of the present invention will become apparent to those of ordinary skill in the art as the description thereof proceeds.

IN THE DRAWINGS

FIG. 5 is a fragmentary view showing a pair of tool holders mounted on a pair of girts in one operative position thereof in machining engagement with side-by-side crankshaft pins being machined;

FIG. 6 is a fragmentary front elevational view illustrating typical relative positions of the axially overlapping tool bits;

FIG. 7 is a fragmentary top plan view thereof;

FIG. 8 is a fragmentary top plan view showing the relative positions of the tool bits as for instance, when the tool bits are in the relative positions 7—7 as shown in FIG. 10;

FIG. 9 is a similar orbitally advanced view as, for example, when the bits are in the relative positions 1-1 shown in FIG. 10.

FIG. 10 is a schematic view showing the relative positions of the axially overlapping tool bits during the course of a machining orbit; and FIG. 11 is a schematic view illustrating relative positions of one tool bit as it passes through the relieved area or slot formed in the other tool holder during the machining operation, the tool holder with the slot being shown for the sake of convenience of illustration as stationary.

Figure 1:
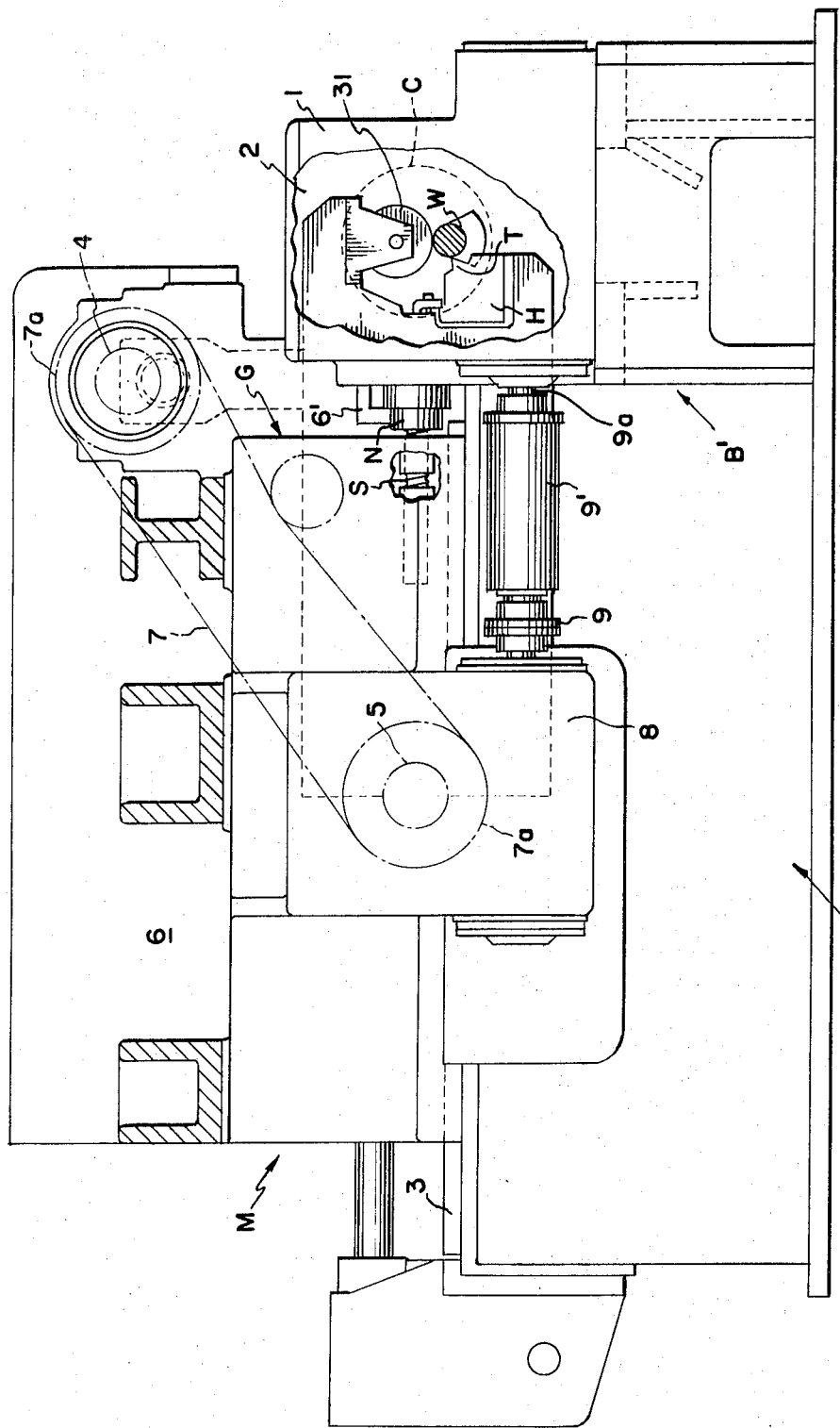
FIG. 1 is a partly sectional, partly schematic, side elevational view showing an orbital crankshaft lathe of the character which is employed in practising the invention.

Referring now more particularly to the accompanying drawings, a machine which typically may be used as both a "rough" cutting machine and "finish" cutting machine is illustrated particularly in FIG. 1. It is understood that, in the normal operation of the typical machining system to be described, one rough cutting machine and one finish cutting machine of this structure would be used. The machine in question is well described in the present assignee's co-pending patent application Ser. No. 255,445 filed May 22, 1972, which is incorporated herein by reference. Accordingly the machine will only be generally described at this time, since for a detailed description of parts the co-pending application is available. Briefly, the machine comprises a frame structure, generally indicated at B as comprising a U-shaped bed rigidly joined to a head and tail stock supporting table structure B' in any suitable manner. Supported on the table structure B', are transversely spaced head and tail stocks 1 and 2 which include rotatable chucks C for receiving the end journals of the crankshaft W to be machined. One or more conventional steady rests may be originally mounted on the bed or table section B' to aid in supporting the crankshaft W in the usual manner as required by the particular machining operation.

Mounted to move fore and aft on ways 3 provided on the bed section B is the master crankshaft and girt assembly, generally designated M, which includes a tool holding girt assembly G, mounted on the crank pins of upper and lower master crankshafts 4 and 5, respectively. The master crankshafts 4 and 5 are, of course, "masters" for the crankshaft to be machined and the number of girts employed will equal the number of crankshaft crank pins to be machined simultaneously by the machine. As shown the master crankshafts and girts are carried by a slide frame structure which includes side plates 6. The end journals of the master crankshafts 4 and 5, as distinguished from the girt mounting crankshaft pins, are journaled in suitable bearings provided on the side plates 6. The master crankshafts 4 and 5 are, of course, mounted in identical angular disposition. The upper master crankshaft 4 may be driven by the lower master crankshaft 5, to maintain absolute synchronization, by chains 7 via sprockets 7a provided on the end journals of both crankshafts 4 and 5. Lower master crankshaft 5 is driven via a gear reduction box 8 which is connected via a coupling 9 and telescoping drive assembly 9' to the output shaft 9a provided on one end of one of the head and tail stock assemblies 1 and 2. The drive for shaft 9a and for revolving the chucks C on the head and tail stock assemblies 1 and 2 is a common motor provided in one of the head and tail stock assemblies 1 or 2 so that the workpiece, which is in exact angular alignment with master crankshafts 4 and 5, is driven in absolute synchronism with them in a rotary path of travel.

Mounted on the head stock 1 and tail stock 2 to project rearwardly therefrom are a pair of ball screws S which are received by ball nuts N depending from arms 6' on the head and tail stock assembly housings 1 and 2. Rotation of the screw shafts S, which are axially fixed, will accordingly move the master shaft and girt assembly M fowardly and rearwardly depending on the direction of rotation. A hydraulic system is preferably utilized to revolve the screws S, first at a rapid traversing rate, and later, as the machining tooling T nears the workpiece W to be machined, at a slower tool feeding rate. The tools T which are carried by the holders H on the girts will be later described in detail with relation to the particular machining operation which is being carried out.

Referring now more particularly to FIGS. 2 through 5 wherein the workpiece W is illustrated; we have shown a crankshaft, or portion thereof, which has a pair of slightly axially overlapping crankshaft angularly offset eccentrically disposed pins 10 and 11 integrally connected by counterweights 12 and 13 with crankshaft main bearings 14 or end journals 15. It is to be understood that the crankshaft being machined may consist of a plurality of end-to-end portions of the character illustrated in FIG. 2, which are rotated about journals projecting outwardly from the outer ends of the endmost portions to be received by the crankshaft lathe chucks.

Figure 2:
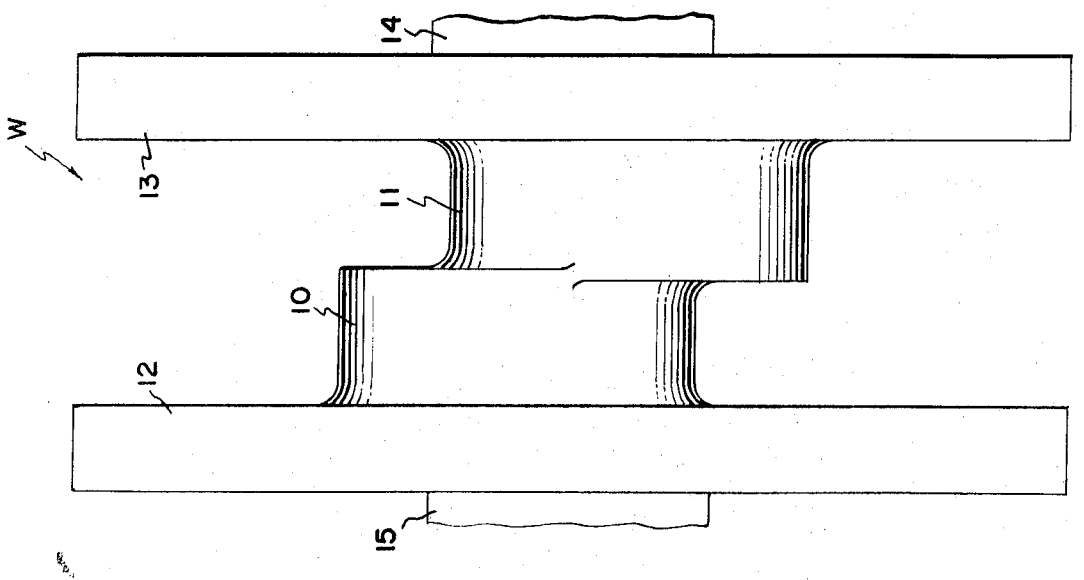
FIG. 2 is a view of the crankshaft workpiece as forged, and prior to any machining operation.

For the sake of simplicity of illustration, it shall be assumed for purposes of this description, however, that the crankshaft consists of the unit shown in FIG. 2, although typically four such angularly, symmetrically disposed units would be machined simultaneously.

Figure 3:
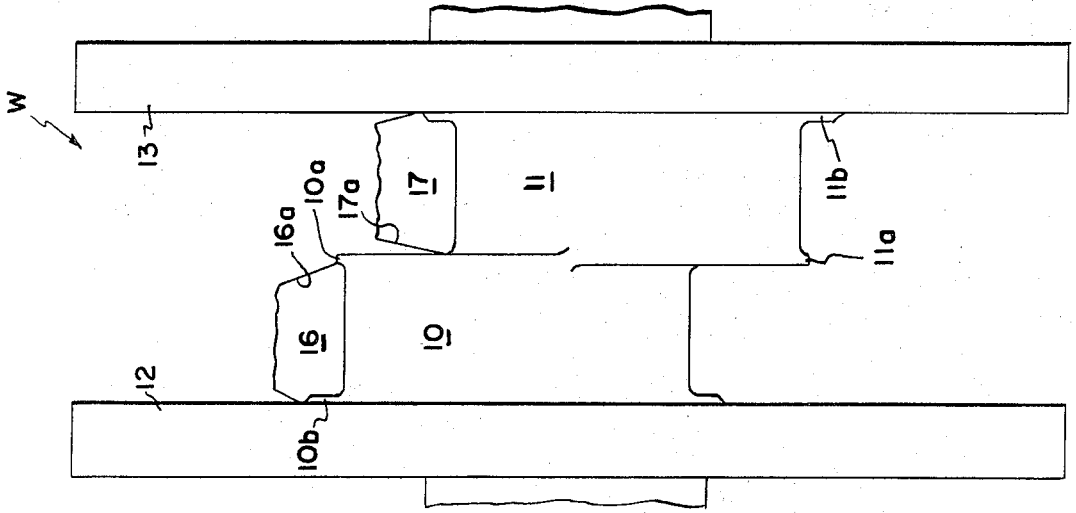
FIG. 3 is a similar view after a roughing cut has been taken.

FIG. 3 demonstrates the crankshaft workpiece W after a roughing cut has been taken by roughing tool bits 16 and 17. The tool bits 16 and 17 may be assumed to be provided on the girts of a machine such as the one briefly described, the machine taking the cuts indicated on substantially the portions of crankshaft pins 10 and 11, which do not axially lap. As shown, the tool bits 16 are relieved as at 16a (FIG. 3), and the tool bits 17 are relieved as at 17a, and so there is never any possibility of an interfering relationship during machining of the endwisely abutting pins 10 and 11.

A rough cut taken in the manner described will leave an inner fin portion 10a on the pin 10 and an inner fin portion 11a on the pin 11. As FIGS. 3 and 4 well demonstrate, material is left on the pin 10 collar at 10b, and pin 11 collar at 11b, which will be removed during the finishing cut, and additionally some material will be removed from the counterweight 12 and 13 inner faces during the finish cut.

Figure 4:
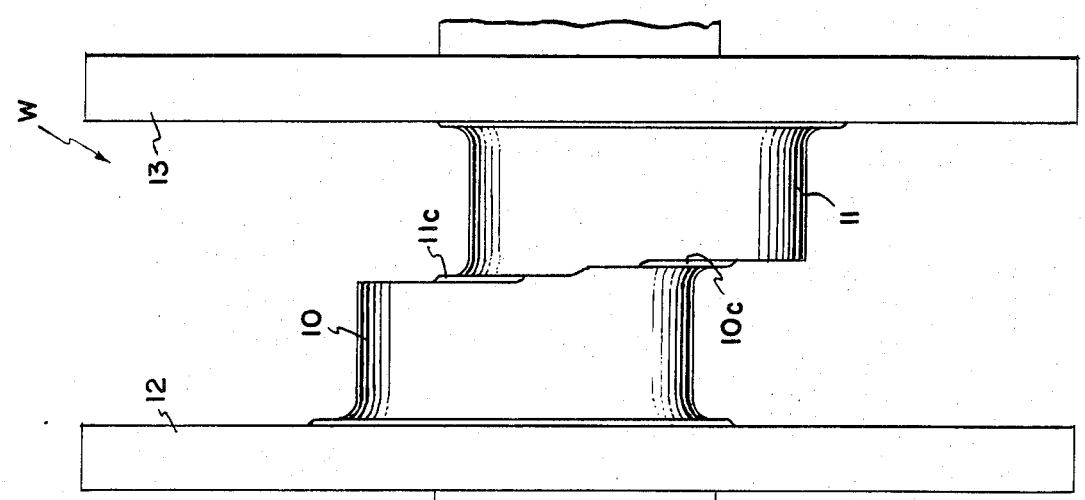
FIG. 4 is a similar view after the finished cut has been taken.

As FIG. 4 demonstrates, during the finish cutting operation, a collar portion 10c is machined on the pin 10 and a collar portion 11c on the axially inner end of the pin 11. In FIG. 5, the finishing tools 18 and 19 are shown in machining engagement with the diagrammatically illustrated pins 10 and 11, respectively. Typically the eccentric pins 10 and 11 may be angularly spaced about 25° relative to the axis of rotation x.

It is to be understood that a like lathe is used for finish machining and that the workpiece is transferred thereto after the rough cutting operation. Each of the finish machining tool bits 18 and 19 comprising the tooling system T for this machine is mounted on a separate tool holder 20 and 21 respectively, via clamps 22 and 23 secured by stud and nut assemblies 24. Each of the tool holders 20 and 21 is mounted on a separate girt 25 and 26 of the girt assembly G, respectively, as by keys 27 and each girt similarly mounts an upper roller holder 28 located as indicated by a key 29. The roller holders 28 each mount pins 30 on which the rollers 31 are journaled.

As FIGS. 6, 7, 8 and 9 particularly indicate, the tools 18 and 19 axially overlap to some extent, and thus could not orbit without interfering with one another. So that the reason for this may become apparent, attention is directed to FIG. 10 wherein eight progressive positions of the tools are laid out to indicate their relative position during orbital movement of the girts 25 and 26. The relative relationship of the tool bits 18 and 19 must shift at the top and bottom of the diagram, when the bits are moving between positions 1 and 2, and 4 and 5.

As FIG. 6 particularly indicates, the holder 20 is relieved or slotted as at 20a on its inner face, and the holder 21 is similarly relieved or slotted as at 21a on its inner face. To permit relative passage of the bits 19 and 18 respectively, the slots 20a and 21a are milled in the holders approximately diagonally or crosswise of the extending tool bits 18 and 19, respectively, as FIG. 11 particularly illustrates, and each slot is of sufficient width to accommodate the arc of travel (see FIG. 11) of the tool bit which must pass through it.

In operation, and with the finishing tools 18 and 19 shown in the FIG. 5 position, which typically may be assumed to be the number 3 position in FIG. 10, the tool bits mounted by girts 25 and 26 are orbited about the like pins of the master crankshaft and follow the paths of travel illustrated in FIG. 10. When the tool bits reach the number 5 position, their relative vertical relationship must reverse, and they must, in effect, pass one another, which they can do with tool bit 18 passing through the slot 21a in holder 21. After 180° of rotation, the reverse must take place and between positions 1 and 2, the tool bit 19 must pass vertically through the slot 20a provided in holder 20.

During the finishing cut, the fins 10a and 11a are removed and collars 10c and 11c are machined as illustrated in FIG. 4. In addition, the collars 10b and 11b are finish machined as are the inner faces of counterweights 12 and 13.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. Apparatus for machining a crankshaft including axially spaced end journals adapted to rotate about a main longitudinal axis and axially abutting, angularly offset, eccentric crankpins comprising:
  means mounting said crankshaft for revolving movement about said main axis;
  means for machining said eccentric crankpins as said crankshaft revolves including:
    axially arranged workholders mounting axially overlapping machining tools in machining engagement with said axially offset crankpins; and
    rotary master crankshaft means connected to said workholders for orbiting said tools in orbital machining paths of travel about said main axis in synchronism with the rotation of said crankshaft to be machined such that said tools alternately pass each other during cutting;
  each of said workholders being axially relieved to receive and pass the overlapping portion of the tool on the other workholder.

2. The apparatus as set forth in claim 1 wherein the master crankshaft means maintains the angular positions of said tools constant relative to said main axis throughout said orbital movement.

3. The apparatus as set forth in claim 2 wherein a slot is cut on the axially inner portion of each tool holder to receive the axially inner portion on the tool of the adjacent holder.

4. The apparatus of claim 1 wherein said rotary crankshaft means moves said tools in such paths that they reverse relative positions during each orbital cycle.

5. The apparatus of claim 1 wherein said rotary crankshaft means moves said tools in such paths that said tools reverse their relative positions along a path transverse to said axis twice per orbit.

6. In an orbital crankshaft lathe; head and tail stock assembly means having work holders thereon for supporting, multiple throw crankshaft end journals adapted to rotate about a main axis, and having axially abutting, angularly offset, eccentric crankpins, for rotation about said main axis; means associated with said work holders for revolving the workpiece about said main axis of revolution; means for machining said eccentric crank pins comprising:
  a master crankshaft and girt assembly comprising master crankshaft means for the crankshaft to be machined, with axially abutting, angularly offset crankpins corresponding to the crankpins of the crankshaft to be machined;
  axially arranged girts mounted on the corresponding axially abutting crankpins of the master crankshaft means;
  tool holders on said girts, mounting axially overlapping cutting tools in cutting engagement with the crankpins of the crankshaft to be machined;
  means for revolving said master crankshaft means in synchronism with the rotation of the crankshaft to be machined to move the tools in orbital paths of travel about said main axis while reversing the relative positions of said tools with respect to a line transverse to said axis during said orbit.

7. The combination as set forth in claim 6 wherein said master crankshaft means moves said tools in such paths that one of said tools always angularly leads the other of said tools relative to said main axis.

8. The apparatus as set forth in claim 6 wherein the axially confronting portions of said tool holders are axially relieved to receive said overlapping portion of said tools to permit the tool to pass each other.

9. The apparatus as set forth in claim 8 wherein said relieved portions comprise slots which will accommodate the overlapping portion of the adjacent tool and permit it to pass.

10. Apparatus for machining a crankshaft including end journals adapted to rotate about a main axis and axially arranged, eccentric crankpins movable in an orbital path of travel relative to said main axis when said crankshaft is rotated about said main axis comprising:

a frame;
  head and tail stock assembly means thereon for rotatably supporting said crankshaft for rotation about said main axis;
  means associated with said work holders for revolving the workpiece about said main axis;
  a master crankshaft and girt assembly comprising:
    master crankshaft means for the crankshaft to be machined having end journals, adapted to rotate about a control axis parallel to said main axis, and axially arranged, eccentric crankpins corresponding to the crankpins of the crankshaft to be machined movable in an orbital paths relative to said control axis when the master crankshaft means is revolved about said main axis; and
    girts journaled on the correspondingly axially offset crankpins of the master crankshaft means to follow the orbital paths of travel thereof, tool holders, mounting axially overlapping tools on said girts in cutting engagement with said crankpins of the crankshaft to be machined; means for revolving said master crankshaft means in synchronism with the rotation of the crankshaft to be machined to concurrently move the tools in orbital paths of travel in machining engagement with the orbitally moving crankpins of the crankshaft to be machined, each of said work holders being axially relieved to pass the overlapping portion of the tool on the other of said holders as the holders and said tools move in said orbital paths.

11. A method for machining a multiple throw crankshaft having end journals adapted to rotate about a main axis and axially abutting, angularly offset, eccentric crankpins movable in orbital paths of travel relative to said main axis when the crankshaft is rotated comprising the steps of
  revolving said crankshaft about said main axis to move said crankpins in said orbital paths of travel;
  rough cutting said crankpins by concurrently orbiting a pair of axially offset rough cut tools, engaged with the orbiting crankpins, about said main axis to rough machine portions of said crankpins while leaving an uncut radial flange portion at the interface of said crankpins;
  and then finish machining said orbiting crankpins by concurrently orbiting a pair of axially overlapping finishing tools, engaged with said crankpins, about said main axis to remove said radial flange and to finish machine said crankpins.

12. A method of machining a multiple throw crankshaft having end journals adapted to rotate about a main axis and axially abutting, angularly offset eccentric crankpins comprising the steps of:

revolving said crankshaft and orbiting said crankpins about said main axis; and concurrently orbiting a pair of axially overlapping crankpin machining tools on separate tool holders about said main axis while maintaining the angular positions of said tools relative to said main axis constant.

13. The method of claim 12 wherein said steps of orbiting the tools includes passing the axially overlapping tools by each other twice per orbit with respect to a line transverse to said axis.

* * * * *